No. 755,852. PATENTED MAR. 29, 1904.
W. N. DENNISON.
MULTISPEED DEVICE FOR TALKING MACHINE MOTORS.
APPLICATION FILED JULY 25, 1903.
NO MODEL.

WITNESSES:
F. J. Haitman
Chas K Burett

INVENTOR
Wilburn N. Dennison.
BY
Horace Pettit
ATTORNEY.

No. 755,852. Patented March 29, 1904.

UNITED STATES PATENT OFFICE.

WILBURN N. DENNISON, OF CAMDEN, NEW JERSEY, ASSIGNOR TO VICTOR TALKING MACHINE COMPANY, A CORPORATION OF NEW JERSEY.

MULTISPEED DEVICE FOR TALKING-MACHINE MOTORS.

SPECIFICATION forming part of Letters Patent No. 755,852, dated March 29, 1904.

Application filed July 25, 1903. Serial No. 166,958. (No model.)

*To all whom it may concern:*

Be it known that I, WILBURN N. DENNISON, a citizen of the United States, and a resident of Camden, State of New Jersey, have invented certain new and useful Improvements in Multispeed Devices for Talking-Machine Motors, of which the following is a full, clear, and complete disclosure.

The object of my invention is to produce a controlling device for talking-machine motors, such that more than one speed of the motor may be obtained without the necessity of accurate and delicate adjustment of said controlling means when the speed of the motor is desired to be changed from one definite number of rotations or speed to another number of rotations per minute or speed.

In talking-machines where large record-disks are used a less angular velocity of the record is required than is the case when small disks are used. This is due to the greater radii of the spiral paths, which in order to produce the same number of sound-vibrations per second must travel beneath the stylus-bar at a slower angular velocity. A large-size talking-machine and its motor may be used to reproduce selections from records of smaller sizes than those which were ordinarily intended to be used with such machine, and it is therefore necessary in the latter case to increase the speed of the motor a definite amount corresponding to the decreased diameter of the smaller record. By the invention herein disclosed this definite increase in speed and its corresponding decrease is easily and instantaneously accomplished by the simple moving of the regulating device to a different position without the necessity of delicate adjustment, while at the same time an adjustment of the speed may be made, if desired.

Broadly, my invention consists in providing an adjustable regulating screw or pin, which may be adjusted between certain limits and placed at any point desired to produce a given speed of the talking-machine motor, while at the same time said regulating screw or pin is made movable independently of the variable adjusting means, so as to produce certain definite changes in the speed of the motor after one of the speeds has been regulated by means of the adjustable pin or screw.

For a full, clear, and exact description of my invention reference may be had to the following specification, and to the accompanying drawings, forming a part thereof, in which—

Figure 1:
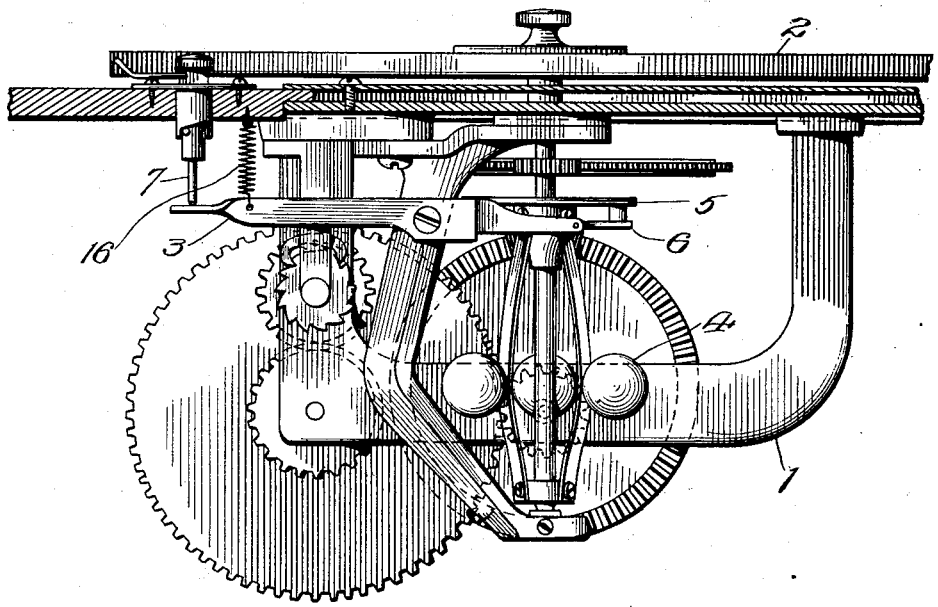
Figure 2:
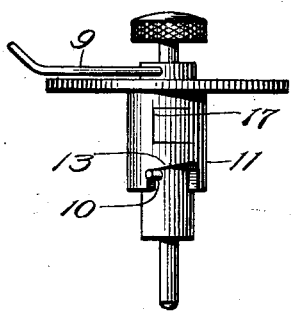
Figure 3:
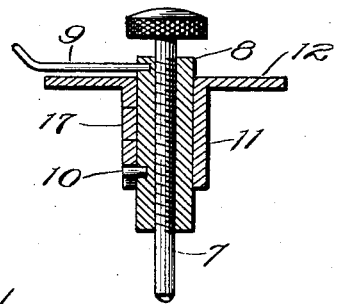

Figure 1 is a side elevation of a talking-machine motor having my improved regulating device shown in connection therewith; Fig. 2, an elevation of my improved regulating device detached from the motor-casing; Fig. 3, a central longitudinal sectional view of the same, and Fig. 4 a view of a slightly-modified form.

Referring to the drawings, the numeral 1 indicates the frame for supporting the gearing of the spring-motor which operates the turn-table 2 of the talking-machine. The parts of this motor are in the usual form employed with talking-machines, and it is considered unnecessary to describe the parts thereof in detail.

The numeral 3 indicates a lever which operates in connection with the usual centrifugal governor 4, which controls a friction-disk 5 to move the same in relation to the frictional pads 6, which are carried by the end of the lever 3.

The multispeed device, which is particularly the subject-matter of this invention, consists of a screw-threaded pin 7, which is carried in an interiorly-screw-threaded sleeve 8. The upper end of this sleeve, which is adapted to extend above the turn-table of the talking-machine, is provided with a handle or lever 9 for rotating the same. The said sleeve 8 is also provided with a stud or pin 10, adjacent the lower end thereof, which is adapted to form a stop to determine the amount of rotation to be given to said sleeve. The sleeve 8 is slidably mounted in a second sleeve 11, which has at its upper end a flange 12 for attaching the sleeve to the talking-machine casing. The lower part of this sleeve 11 is provided with an elongated notch or recess, within which the pin 10 is adapted to work. This recess has an inclined upper wall 13, so that when the pin 10 is adjusted to different portions of the recess said sleeve will be in different vertical positions.

Figure 4:
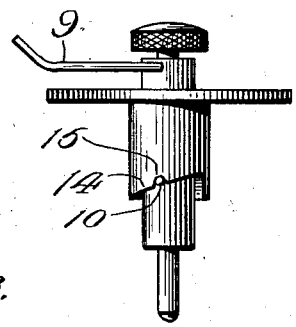

The modification shown in Fig. 4 is in all substantial respects similar to that above described; but instead of having the recess within which the pin 10 is adapted to work limited in width there is no abrupt rear wall, such as shown in Fig. 2, the upper inclined wall 13 being extended spirally to the end of the sleeve, as indicated at 14, and is provided with a notch or notches 15, which the pin 10 may enter as it passes along said incline.

If the proportion and arrangement of parts are not such as to keep the lever 3 in contact with the end of the pin 7, a spring 16 may be provided for holding said lever 3 in a raised position against the end of the pin 7.

If the inclines 13 or 14 should be of such a pitch as to prevent the pin 10 from being easily retained in position thereon, the outer or fixed sleeve 11 can be provided with a leaf-spring portion 17, which is bent slightly inward and bears against the inner sleeve 8 to retain the same frictionally in position. This frictional contact between the sleeves will enable the pin 10 to be retained at any point desirable upon the inclines 13 or 14.

In operation the adjustable pin 7 is turned until the speed of the talking-machine turn-table is such as to give the correct sound reproduced from the record. This adjustment is usually made when the pin 10 is in the lower part of the recess or in the position opposite to that shown in Fig. 2. When this adjustment has been made, the selection contained in the record is allowed to be reproduced in the usual manner. With this adjustment the record turns too slowly for a smaller-size disk, and therefore the lever 9 should be turned so that the pin is retained in the other corner of the recess, and thereby the motor is allowed to increase the speed of the turn-table.

The relation between the upper and lower ends of the incline 13 are such as to give a definite increase in the rotation of the table when the pin passes from one portion to the other, so that if the speed is correctly adjusted for one size of record-disk the speed will be approximately correct for the next smaller size of record-disk when the pin is in the other position.

In the modification shown in Fig. 4 the notch 15 corresponds to the lower end of the incline 13 in the modification first described; but the continuation of the incline is for the purpose of allowing the speed-regulating device to be used as a brake to entirely stop the motor when desired, the lever 9 being used both as a regulating device for giving different speeds to the turn-table when large and small records are used and also for entirely stopping the rotation of the turn-table. I do not wish to be limited to the exact arrangement and form of parts herein set forth, for various changes may be made without departing from the spirit and scope of my invention, and various modifications may be designed which will produce the same result.

Having thus described my invention, what I claim, and desire to protect by Letters Patent of the United States, is—

1. A multispeed-regulator for talking-machines, comprising a governor, an adjusting-screw for regulating the speed of the governor, connections between said screw and governor, a slidable rotatable sleeve within which said screw is mounted, an inclined guide for said rotatable sleeve and for limiting the movement of said sleeve to give different speeds having definite relations to each other.

2. A multispeed-regulator for talking-machines, comprising a governor, an adjusting-screw for regulating the speed of the governor, connections between said screw and governor, a slidable rotatable sleeve within which said screw is mounted, a fixed sleeve for holding said slidable sleeve, said sleeves being provided with a projection and corresponding recess for limiting the movement of said movable sleeve in relation to said fixed sleeve to give different speeds having definite relations to each other.

3. A multispeed-regulator for talking-machines, comprising a governor, an adjusting-screw for regulating the speed of the governor, connections between said screw and governor, a slidable sleeve within which said screw is mounted, a fixed sleeve for holding said slidable sleeve, means for moving said slidable sleeve, a projection carried by said slidable sleeve, said fixed sleeve having an inclined portion, said inclined portion being provided with stops for limiting the movement of said projection to definite distances thereover to give different speeds having definite relations to each other.

4. A multispeed-regulator for talking-machines, comprising a governor, an adjusting-screw for regulating the speed of the governor, connections between said screw and the governor, a slidable sleeve within which said screw is mounted, a fixed sleeve for holding said slidable sleeve, a lever for moving said slidable sleeve radially, a projection carried by said slidable sleeve, said fixed sleeve having a recess with an inclined rear wall within which is a socket for limiting the movement of said projection to definite distances on said incline to give different speeds having definite relations to each other.

5. A multispeed-regulator for talking-machines, comprising a governor, an adjusting-screw for regulating the speed of the governor, connections between said screw and governor, a slidable sleeve within which said screw is mounted, a fixed sleeve for holding said slidable sleeve, said fixed sleeve having a spring portion adapted to hold said slidable sleeve frictionally in position, and means for limiting the movement of said slidable sleeve within said fixed sleeve to give different speeds having definite relations to each other.

In witness whereof I have hereunto set my hand this 22d day of July, A. D. 1903.

WILBURN N. DENNISON.

Witnesses:
 LEWIS H. VAN DUSEN,
 EDW. W. VAILL, Jr.